United States Patent [19]

Appel et al.

[11] Patent Number: 4,953,408
[45] Date of Patent: Sep. 4, 1990

[54] CAPACITIVE TYPE ELECTROMAGNETIC FLOWMETER

[75] Inventors: Eggert Appel, Dransfeld; Wilfried Kiene, Muenden; Rudi Kuchemann, Hardegsen; Dieter Meier, Gottingen; Peter Nissen, Rosdorf, all of Fed. Rep. of Germany

[73] Assignee: Fischer & Porter Company, Warminster, Pa.

[21] Appl. No.: 400,558

[22] Filed: Aug. 30, 1989

[30] Foreign Application Priority Data

Aug. 31, 1988 [DE] Fed. Rep. of Germany ....... 3829564

[51] Int. Cl.$^5$ .............................................. G01F 1/60
[52] U.S. Cl. .................................... 73/861.16; 361/152
[58] Field of Search ........... 73/861.16, 861.17, 861.12; 361/152, 154

[56] References Cited

U.S. PATENT DOCUMENTS

| | | | |
|---|---|---|---|
| 3,695,104 | 10/1972 | Mannherz et al. | 73/861.12 |
| 3,824,856 | 7/1974 | Yard | 73/861.12 |
| 4,019,386 | 4/1977 | Appel | 73/861.14 |
| 4,098,118 | 7/1978 | Schmoock | 73/861.12 |
| 4,462,060 | 7/1984 | Schmoock | 73/861.17 |
| 4,704,907 | 11/1987 | Mannherz et al. | 73/861.17 |

Primary Examiner—Donald O. Woodiel
Attorney, Agent, or Firm—Michael Ebert

[57] ABSTRACT

An electromagnetic flowmeter in whose primary the fluid to be metered is conducted through a flow tube to intercept a composite magnetic field to induce therein a voltage which is picked up by capacitive metering electrodes. The composite field is formed by a low-frequency comparison field having a long period on which is superimposed a high-frequency switching field having a short period. The voltage from the capacitive electrodes is fed by way of a high pass filter to the input amplifier of a secondary whose amplified output is analyzed to provide separate components, one originating from the comparison field and the other from the switched field. An output signal is produced in accordance with the time phasing of these components, after compensating for the signal loss experienced in the filter by the comparison field component by means of a compensation voltage derived from the switched field component.

7 Claims, 2 Drawing Sheets

CAPACITIVE TYPE ELECTROMAGNETIC FLOWMETER

BACKGROUND OF INVENTION

1. Field of Invention

This invention relates generally to electromagnetic flowmeters having capacitive type metering electrodes, and more particularly to a flowmeter of this type which is excited by a composite electromagnetic field constituted by a DC generated magnetic comparison field and an AC generated magnetic switched field.

2. Status of Prior Art

Electromagnetic flowmeters such as those disclosed in U.S. Pat. Nos. 3,695,104 and 3,824,856 are especially adapted to measure the volumetric flow rates of fluids which present difficult handling problems, such as corrosive acids, sewage and slurries. Because an instrument of this type is free of flow obstructions, it does not tend to plug or foul.

In a magnetic flowmeter, an electromagnetic field is generated whose lines of flux are mutually perpendicular to the longitudinal axis of the flow tube through which the fluid to be metered is conducted and to the transverse axis along which the measuring or metering electrodes are located at diametrically-opposed positions. The operating principles of this meter are based on Faraday's law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous value of the voltage established at the electrodes.

In the Appel U.S. Pat. No. 4,019,386 and in the Schmoock U.S. Pat. No. 4,098,118, instead of measuring electrodes in direct contact with the fluid, use is made of a pair of measuring electrodes isolated from the fluid by a layer of insulation. Each measuring electrode forms one plate of a capacitor whose dielectric is the insulation layer and whose other plate is the fluid, the electrodes acting as a capacitance sensor to detect the voltage induced in the fluid. The flow signal is thereafter measured through a pair of capacitors, the smaller the capacitance values of the capacitors, the higher is the resultant electrical impedance.

A capacitance electrode sensor of this type obviates slurry and galvanic noise problems and is not subject to leakage. Also among the advantages of a capacitance sensor over contact electrodes in a magnetic flowmeter are that the conductivity range of the fluid to be metered 20 may extent down to as low as 0.1 $\mu$S/cm or less, and one may use ordinary metals for the electrodes rather than special materials capable of withstanding the adverse effects of corrosive or abrasive fluids in contact with the electrodes.

With a flowmeter of the capacitive type, in order to measure flow rate with zero stability, it is advantageous to drive the electromagnet coils with a low-frequency excitation voltage to establish the required electromagnetic field. Then virtually no disturbing induction currents are produced. And by choosing an appropriate excitation frequency having a predetermined relationship to the line frequency of the power source, this makes it possible to suppress line-frequency interference.

In a capacitive flowmeter, the signal from the capacitive electrodes of the primary are applied to the input amplifier of the flowmeter secondary. The use of a low-frequency excitation in this context is disadvantageous in regard to picking up the signal from the electrodes. The high impedance of the capacitive electrodes imposes very high requirements on the input impedance of the amplifier. In order to avoid a signal loss, the input resistance of the amplifier together with the coupling capacitance of the electrodes form a high-pass filter to the conductive medium represented by the fluid being metered.

SUMMARY OF INVENTION

The main object of this invention is to provide an electromagnetic flowmeter of the capacitive type which is adapted to tolerate signal losses at a low excitation frequency in order to be able to use capacitive electrodes having relatively small electrode surfaces.

Also an object of the invention is to render the amplified signals substantially independent of the flow profile of the fluid being metered.

More particularly, an object of this invention is to provide a reduced loss of signal via a high pass filter from the capacitance electrodes in the primary of the flowmeter to the input amplifier of the secondary by using for this purpose a magnetic switched field having a frequency which is high relative to the low-frequency excitation field.

Also an object of this invention is to provide a capacitive type flowmeter which is relatively inexpensive and which operates efficiently and reliably.

Briefly stated, these objects are attained in an electromagnetic flowmeter in whose primary the fluid to be metered is conducted through a flow tube to intercept a composite magnetic field to induce therein a voltage which is picked up by capacitive metering electrodes. The composite field is formed by a low-frequency comparison field having a long period on which is superimposed a high-frequency switching field having a short period. The voltage from the capacitive electrodes is fed by way of a high pass filter to the input amplifier of a secondary whose amplified output is analyzed to provide separate components, one originating from the comparison field and the other from the switched field. An output signal is produced in accordance with the time phrasing of these components, after compensating for the signal loss experienced in the filter by the comparison field component by means of a compensation voltage derived from the switched field component.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
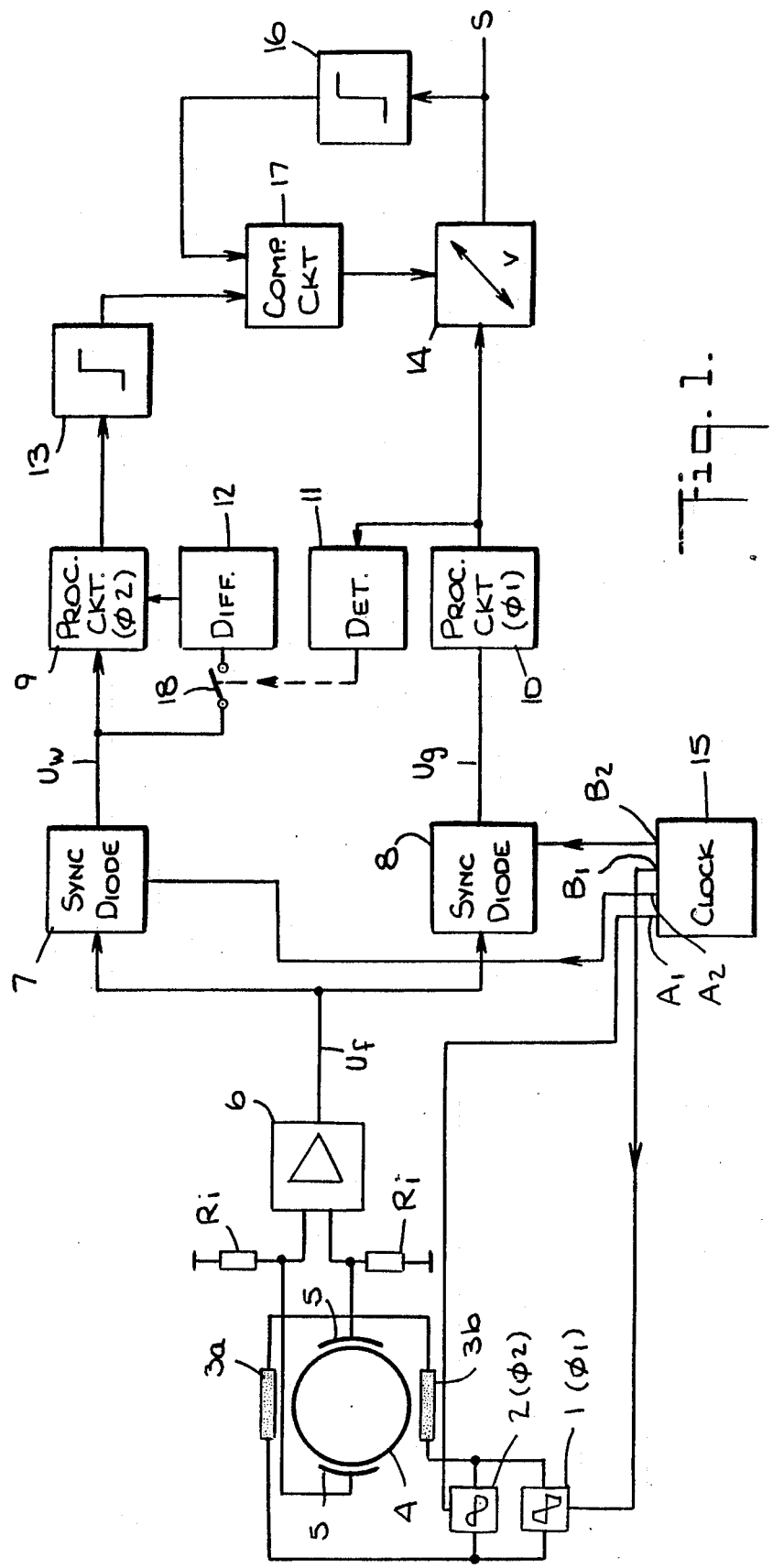
FIG. 1 is a block diagram of a capacitive-type flowmeter in accordance with the invention.

Referring now to FIG. 1, a flowmeter according to the invention includes a primary having a flow tube 4 through which the fluid to be metered is conducted. Capacitive electrodes 5 insulated from the fluid are mounted at diametrically opposed positions on the tube along a transverse electrode axis which is perpendicular to the longitudinal flow axis. A pair of electromagnet coils 3a and 3b are disposed at diametrically opposed positions along a transverse magnet axis at right angles both to the electrode axis and the flow axis. When the fluid intercepts the magnetic field established by the electromagnets, a signal voltage is induced therein as a function of flow rate, which voltage is picked up by the electrodes.

The signal voltage from electrodes 5 of the flowmeter primary is applied to the input terminals of the input amplifier 6 of the flowmeter secondary, each input terminal being connected to ground through a resistor $R_1$. The capacitive electrodes 5 in combination with the respective resistors $R_1$ form a high-pass filter.

Input amplifier 6 yields a voltage $U_f$ equal to $U_g + U_w$ in which:

$U_g$ represents a voltage component originating with a magnetic comparison field $\phi_1$, and $U_w$ represents a voltage component originating with a magnetic switching field $\phi_2$.

Magnetic comparison field $\phi_1$ is produced by a DC generator 1 whose square wave mono-polar output has a relatively low frequency; hence a long period. The output of DC generator 1 is applied to the serially-connected electromagnet coils 3a and 3b. Magnetic switched field $\phi_2$ is produced by an AC generator 2 whose bi-polar output has a frequency which is high relative to that of generator 1. The output of generator 2 is applied to the magnet coils in parallel with the output of generator 1 so that the resultant magnetic field is a composite of the comparison and switched fields.

Generators 1 and 2 are controlled by a clock 15 whose clock signal $A_1$ is applied to generator 2, and whose clock signal $B_1$ is applied to generator 1. The timing relationship of these clock signals to the monopolar drive voltage which produces magnetic comparison field $\phi_1$ and the bi-polar voltage which produces magnetic switching field $\phi_2$ is shown in FIG. 2.

Voltage $U_f$ from the output of input amplifier 6 is applied to two synchronous diodes 7 and 8. Synchronous diodes 7 and 8 are controlled by clock signals from clock 15, clock signal $A_2$ being applied to sync diode 7 and clock signal $B_2$ to sync diode 8. The timing of these clock signals and their duration relative to clock signals $A_1$ and $A_2$ are shown in FIG. 2.

Sync diode 7 rectifies voltage $U_f$ to derive therefrom the voltage component $U_w$ which it supplies to a processing circuit 9 for switching field $\phi_2$. Sync diode 8 rectifies voltage $U_f$ to derive therefrom the voltage component $U_g$ which it supplies to a processing circuit 10 for comparison field $\phi_1$.

Figure 2:
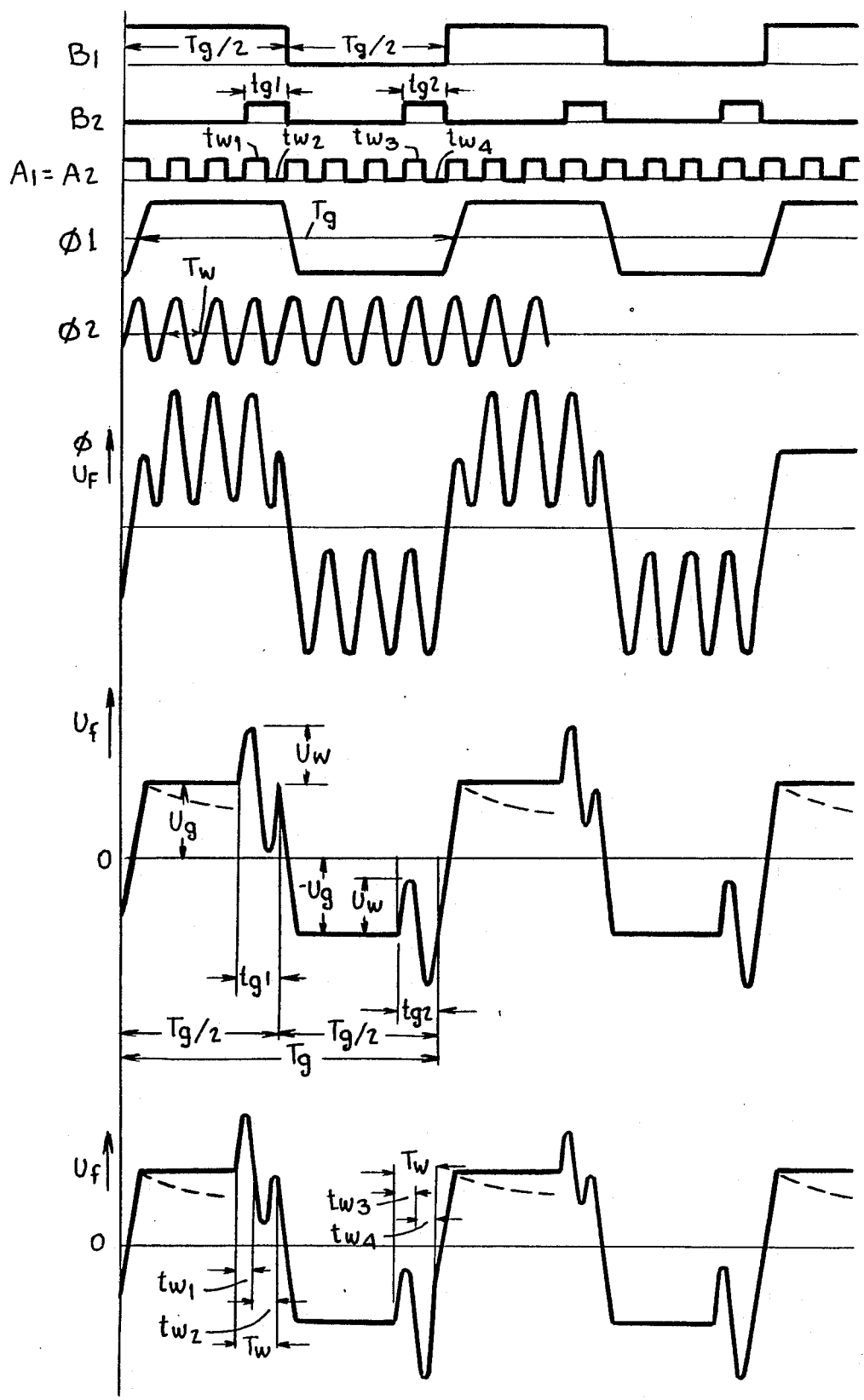
FIG. 2 illustrates the timing diagram and magnetic field and voltage plots of the flowmeter circuit shown in FIG. 1.

Generator 1 produces a bi-polar comparison field having a long period $T_g$ as shown in FIG. 2, and generator 2 produces a switched field with a much shorter period $T_w$, the two fields being superimposed to establish composite field $\phi$. Signal voltage $U_f$ therefore has essentially the same wave form as composite field $\phi$.

The components of signal voltage $U_f$ which correspond to comparison field $\phi_1$ are analyzed in segments $t_{g1}$ and $t_{g2}$. These segments are located at the end portions of the half periods $T_g/2$ of comparison field $\phi_1$ whose full period is $T_g$.

In processing circuit 10, the components $t_{g1}$ and $t_{g2}$ of voltage $U_f$ originating in comparison field $\phi_1$ are algebraically subtracted. This yields:

$$(+U_g)_{tg1} - (-U_g)_{tg2} = 2U_g.$$

In processing circuit 9, the components of signal voltage $U_f$ originating in switching field $\phi_2$ are algebraically summed. For the first half period $T_g/2$ yields:

$$(U_g + U_w)_{tw1} - (U_g - U_w)_{tw2} = 2U_w$$

And for the second period $T_g/2$, this yields:

$$(U_g + U_w)_{t23} - (-U_g - U_3)_{tw4} = 2U_w.$$

Because of the effect of the high pass filter on input amplifier 6, the value of $U_g$ is lower in amplitude than $U_w$ as measured at the outputs of processing circuits 9 and 10.

A discriminator 13 is connected directly to the output of processing circuit 9 while a discriminator 16 is connected to the output of processing circuit 10 through an output amplifier 14. The amplification factor of amplifier 14 is controlled by a compensation circuit 17 responsive to the discriminators.

Discriminators 13 and 16 supply the significant values $U_w$ and $U_g$ to compensation circuit 17 which then so modulates the amplification factor of output amplifier 14 for value $U_g$ that the output magnitude S of $U_g$ is safeguarded from the signal loss of value $U_g$. In this way, compensation is effected in the range of the low frequency signal.

If value $2U_g$ equals zero, this is picked up by a detector 11 which then acts to close an electronic switch 18. Switch 18, when closed, connects the output $U_w$ from sync diode 7 to a difference element 12 connected to an input of processing circuit 9 to compensate the zero point of processing circuit 9 in its output side.

While there has been shown and described a preferred embodiment of a capacitive type electromagnetic flowmeter in accordance with the invention, it will be appreciated that many changes and modifications may be made therein without, however, departing from the essential spirit thereof.

We claim:

1. An electromagnetic flowmeter of the capacitive type comprising:
   (a) a primary having a flow tube through which a fluid to be metered is conducted to intercept a composite magnetic field produced by a pair of electromagnet coils to induce therein a signal voltage which is picked up by a pair of capacitive electrodes, said composite field being formed by a low-frequency comparison field having a long period and a high-frequency switched field having a short period; and
   (b) a secondary including an input amplifier to which said signal voltage from the primary is applied through a high-pass filter, said input amplifier yielding an amplified output voltage originating from the composite field, means to analyze said output voltage to derive therefrom separate components, one originating from the comparison field and the other from the switched field, and means to produce an output signal in accordance with the time phasing of said components after compensating for the signal loss experienced in the filter by the comparison field component by means of a compensation voltage derived from the switched field component.

2. A flowmeter as set forth in claim 1, wherein said comparison field is produced by a mono-polar generator whose output is applied to the coils.

3. A flowmeter as set forth in claim 2, wherein said switched field is produced by a bi-polar generator whose output is applied to said coils.

4. A flowmeter as set forth in claim 1, wherein said comparison field component is derived from a first synchronous diode connected to the output of said input amplifier.

5. A flowmeter as set forth in claim 4, wherein said switched field component is derived from a second synchronous diode connected to the output of said input amplifier.

6. A flowmeter as set forth in claim 5, wherein the component from the first and second diodes are applied to first and second processing circuits, respectively.

7. A flowmeter as set forth in claim 6, wherein the output of the first processing circuit is applied through a first discriminator to one input of a compensation circuit and the output of the second processing circuit is applied through a signal amplifier and a second discriminator to another input of said compensation circuit which acts to modulate the signal amplifier to compensate for the signal loss experienced in the filter by the comparison field component.

* * * * *